US010015140B2

(12) United States Patent
Bernoth (10) Patent No.: US 10,015,140 B2
(45) Date of Patent: Jul. 3, 2018

(54) IDENTIFYING ADDITIONAL FIREWALL RULES THAT MAY BE NEEDED

(75) Inventor: Andrew John Bernoth, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 3440 days.

(21) Appl. No.: 11/050,187

(22) Filed: Feb. 3, 2005

(65) Prior Publication Data

US 2006/0174337 A1    Aug. 3, 2006

(51) Int. Cl.
*H04L 29/06* (2006.01)
(52) U.S. Cl.
CPC ............................... *H04L 63/0263* (2013.01)
(58) Field of Classification Search
CPC ............. H04L 63/1433; H04L 53/1408; H04L 63/0263; H04L 63/029; G06F 2221/2101
See application file for complete search history.

(56) References Cited

U.S. PATENT DOCUMENTS

| | | | |
|---|---|---|---|
| 6,405,318 B1 * | 6/2002 | Rowland ........................ | 726/22 |
| 6,546,423 B1 | 4/2003 | Dutta et al. ................... | 709/225 |
| 6,574,666 B1 | 6/2003 | Dutta et al. ................... | 709/227 |
| 6,606,710 B2 | 8/2003 | Krishnan ....................... | 713/201 |
| 6,611,875 B1 | 8/2003 | Chopra et al. ................ | 709/245 |
| 6,687,732 B1 | 2/2004 | Bector et al. ................. | 709/200 |
| 6,691,168 B1 | 2/2004 | Bal et al. ...................... | 709/238 |
| 6,701,432 B1 | 3/2004 | Deng et al. ................... | 713/153 |
| 2003/0051026 A1 * | 3/2003 | Carter et al. .................. | 709/224 |
| 2003/0149761 A1 * | 8/2003 | Baldwin et al. .............. | 709/224 |
| 2005/0076238 A1 * | 4/2005 | Ormazabal et al. .......... | 713/201 |
| 2006/0037075 A1 * | 2/2006 | Frattura et al. ................ | 726/22 |
| 2007/0056038 A1 * | 3/2007 | Lok ................................ | 726/23 |

* cited by examiner

*Primary Examiner* — Tamara T Kyle
(74) *Attorney, Agent, or Firm* — Yee & Associates, P.C.; Brian M. Restauro (57) ABSTRACT

System, method and program product for managing a security policy of a firewall. The firewall receives a message packet addressed to a specified port of a destination IP address and determines that the firewall does not have a message flow rule which permits passing of the message packet to the port. The port is tested to determine if the port is open. If so, an administrator is queried whether the firewall should have a message flow rule which permits passing of the message packet to the port. If not, an administrator is not queried whether the firewall should have a message flow rule which permits passing of the message packet to the port. There may be first and second firewalls located between the source IP address and destination IP address. Before the port is tested, a central database is checked to learn if the central database has a record of whether the first firewall should have a message flow rule which permits passing of the message packet to the port. If not, and the port is found to be open, the central database is updated to indicate that both the first and second firewalls should have a message flow rule which permits passing of the message packet to the port. Also, the security policy of the first firewall is updated with a message flow rule which permits passing of the message packet to the port. The second firewall is not updated until it encounters a message packet addressed to the port.

21 Claims, 6 Drawing Sheets

IDENTIFYING ADDITIONAL FIREWALL RULES THAT MAY BE NEEDED

BACKGROUND OF THE INVENTION

The invention relates generally to computer network firewalls, and more particularly to a system, method and program to identify additional rules which may be needed by a firewall to permit messages with different combinations of source IP address, destination IP address, destination port, protocol, etc. to flow through the firewall.

There are different types of networks today. For example, there may be an intranet for local communications within an enterprise. It is presumed that all users of the intranet are trustworthy because they all work for the same enterprise. Therefore, usually there is relatively little security concern within the intranet. However, oftentimes users of the intranet want to communicate with another entity located on another network outside of the intranet. Because this other entity may not work for the enterprise, and this other network is not under control of the enterprise, this other entity and network cannot be thoroughly trusted. Therefore, a firewall may be installed at the gateway to the intranet. The firewall is responsible for enforcing a security policy for incoming communications. This security policy may define which types of networks that the intranet is permitted to communicate, what ports of what destination devices within the firewall are permitted to receive communications from what source devices and what protocols are permitted for the communications. The source and destination devices are identified by respective IP address. Each combination of source and destination IP address/protocol and port is called a "flow", and the "rules" within the firewall specify what flows are permitted to pass through the firewall.

Typically, the rules specify combinations of source IP address, destination IP address, port, protocol, etc. of messages which are permitted to pass through the firewall. If a message arrives, and its combination of source IP address, destination IP address, port, protocol, etc. does not match a rule, then the message will be discarded and not forwarded to the specified destination. There are many reasons for discarding such messages. For example, they may originate from an untrusted/unsecure network, and the security policy of the destination network may prohibit all such incoming messages. Also, the message may be addressed to a port or use a protocol which is not supported in the destination network.

The most common protocols are TCP, UDP and ICMP. Each of these protocols includes additional criteria such as the range of ports used by TCP and UDP for certain types of requests, and the types and codes of ICMP. The TCP and UDP ports indicate which application in the recipient device should provide the requested services. It is also desirable in some cases to limit the range of ports for certain types of communications. The limitation on the range of ports facilitates the handling of the requested service. For example, many programs are written to open any available TCP or UDP port. This makes the identification of the application using such a port difficult. In some such cases it is possible to restrict the range of ports available to these applications to assist in identifying which application is using the port. Some types of firewalls have the ability to understand some applications that commonly open random ports, such as FTP, TFTP, H.323 etc. It may be preferable for some networks to not communicate with another network which uses a different range of TCP or UDP ports. Also, some networks may not wish to accept certain types of ICMP messages. For example, some destination networks may not wish to process "route redirect" messages as the device sending the "route redirect" may not be trusted. Furthermore, some protocols are more controllable than others. For example, TCP provides "handshaking" for every communication whereas UDP does not. So, TCP is more controllable than UDP and therefore it may be preferable for some networks to not accept UDP communications.

Different techniques have been used to determine if two networks, connected through firewalls or routers are authorized to communicate with each other, and which protocols including additional criteria are authorized for the communication. For example, if a systems administrator of an external network wants to communicate through its firewall or router to an enterprise behind the enterprise's firewall, the systems administrator of the external network can simply send its configuration information to a systems administrator for the enterprise. The configuration information may include the type of external network and the protocols it supports including the additional criteria for each protocol. Then, the systems administrator of the enterprise manually reviews the configuration information and determines if this external network should be permitted to communicate with the enterprise through the enterprise's firewall and if so, what IP protocol to use. If the system administrator believes the requested flow is acceptable according to the enterprise's policy, the systems administrator updates a rule file in the firewall of the enterprise to permit it to communicate with the external network with a specified IP protocol including additional criteria. Likewise, the systems administrator of the external network will update a rule file in its firewall or router to permit it to receive communications from the enterprise's network with a specified IP protocol including additional criteria.

Usually at least once a year, all the firewall rules are verified to ensure they still conform to the company policy. Traditionally this is completed manually by the systems administrator, or a person outside of the day-to-day operations of the firewall such as a security administrator. The systems administrator or security administrator reviews each firewall rule to confirm the network type of each IP address and ensures that the flows configured in the firewall are acceptable according to the company policy. While this technique is effective, it requires tedious, human review of the configuration information from each network with which communication is desired, and there can be many such networks. Also, it focusses on checking permissibility of specified communications, rather than determining all potential permitted communications. Also, routers and firewalls of networks are often changed, and this may require the foregoing interaction between the systems administrator or security administrator to be repeated.

There is another technique to determine if two networks, connected through firewalls or routers are authorized to communicate with each other, and which protocols (including additional criteria) are authorized for the communication. According to this technique, a packet generator is located inside the firewall or router of an originating network being checked for compatibility with other networks. The packet generator sends a set of communication packets onto the network, but preferably to an unoccupied IP address. The communication packets of each set have different IP protocols with different additional criteria, but ones that the originating network supports. A "sniffer" is located just outside the firewall or router of the originating network and logs the generated packets that are allowed to pass through the firewall or router of the originating network.

Based on the presence or absence of the original packet being logged by the "sniffer" a report can be generated as to what traffic the firewall or router allows through. This report can then be compared with the corporate security standards. While this technique is partially automated, it burdens the networks with many communication packets to handle. Also, it does not consider the type of destination network as a criteria in determining whether the originating network should permit communication; this is still left as a manual task once the report has been manually generated. The other concern is that the corporate security standards often change.

It was also known that if a message packet does not reach its intended destination, the source computer that sent the message packet would learn of this, via some type of return code or the absence of a response altogether. Then, the user of the source computer would alert a firewall administrator for the network of the intended destination to investigate the problem. In response, the firewall administrator would investigate the reason that the message packet did not reach its intended destination. The firewall administrator would check if each firewall in the path from the source computer to the destination device included a rule that permitted the flow. If all the firewalls do not include the requisite rule, then the firewall administrator would add the rule if the firewall administrator knew it was valid, or ask the owner of the network of the destination device to determine if the rule should be added to the firewall, and if so, open a request to create and add the rule. If all the firewalls in the path have a rule that permits this flow, but the message packet did not reach its intended destination, then the firewall administrator would check communication linkages to determine whether a logical of physical network connection is configured or connected. If during the course of this path verification the message packet is recorded, usually by use of a sniffer, on the logical destination network, the firewall administrator would scan the destination system to determine if the intended destination port is open. The administrator scanned the destination port using a known tool which generates a test packet and sends it to the destination port. The tool then checks for a response indicating that the port is open. If the port is not open, the administrator would check the contract with or query the owner of the destination device to determine if the port should be open. If so, the administrator would open the port.

A general object of the present invention is to identify additional rules which may be needed by a firewall to permit messages with different combinations of source IP address, destination IP address, destination port, protocol, etc. to flow through the firewall.

A more specific object of the present invention is to provide a technique of the foregoing type which is at least partially automated.

SUMMARY OF THE INVENTION

The invention resides in a system, method and program product for managing a security policy of a firewall. The firewall receives a message packet addressed to a specified port of a destination IP address and determines that the firewall does not have a message flow rule which permits passing of the message packet to the port of the destination IP address. The port of the destination IP address is tested to determine if the port is open. If so, an administrator is queried whether the firewall should have a message flow rule which permits passing of the message packet to the port of the destination IP address. If not, an administrator is not queried whether the firewall should have a message flow rule which permits passing of the message packet to the port of the destination IP address.

In accordance with a feature of the present invention, the testing of the port of the destination IP address to determine if the port is open comprises sending a test message packet to the port and checking for an acknowledgment or other response indicating that the port is open. If the firewall is located between a sender of the test message packet and the destination IP address, then the firewall includes a message flow rule which permits message packets to flow from a source IP address of the sender of the test message packet to the destination IP address.

The invention also resides in a system, method and program product for managing a security policy of first and second firewalls located between a source IP address and a destination IP address. The first firewall receives a message packet addressed to a specified port of the destination IP address and determines that the first firewall does not have a message flow rule which permits passing of the message packet to the port of the destination IP address. The second firewall does not have a message flow rule which permits passing of the message packet to the port of the destination IP address. A central database is checked to learn that the central database does not have a record of whether the first firewall should have a message flow rule which permits passing of the message packet to the port of the destination IP address. In response, the port is tested to determine if the port is open. If the port is open, the central database is updated to indicate that both the first and second firewalls should have a message flow rule which permits passing of the message packet to the port of the destination IP address. Also, the security policy of the first firewall is updated with a message flow rule which permits passing of the message packet to the port of the destination IP address.

In accordance with a feature of the invention, upon receipt at the second firewall of a message packet addressed to the specified port of the destination IP address and a determination that the second firewall does not have a message flow rule which permits passing of the message packet to the port of the destination IP address, the central database is checked to learn that the second firewall should have a message flow rule which permits passing of the message packet to the port of the destination IP address. Also, the security policy of the second firewall is updated with a message flow rule which permits passing of the message packet to the port of the destination IP address.

DETAILED DESCRIPTION OF THE PREFERRED EMBODIMENTS

Figure 1:
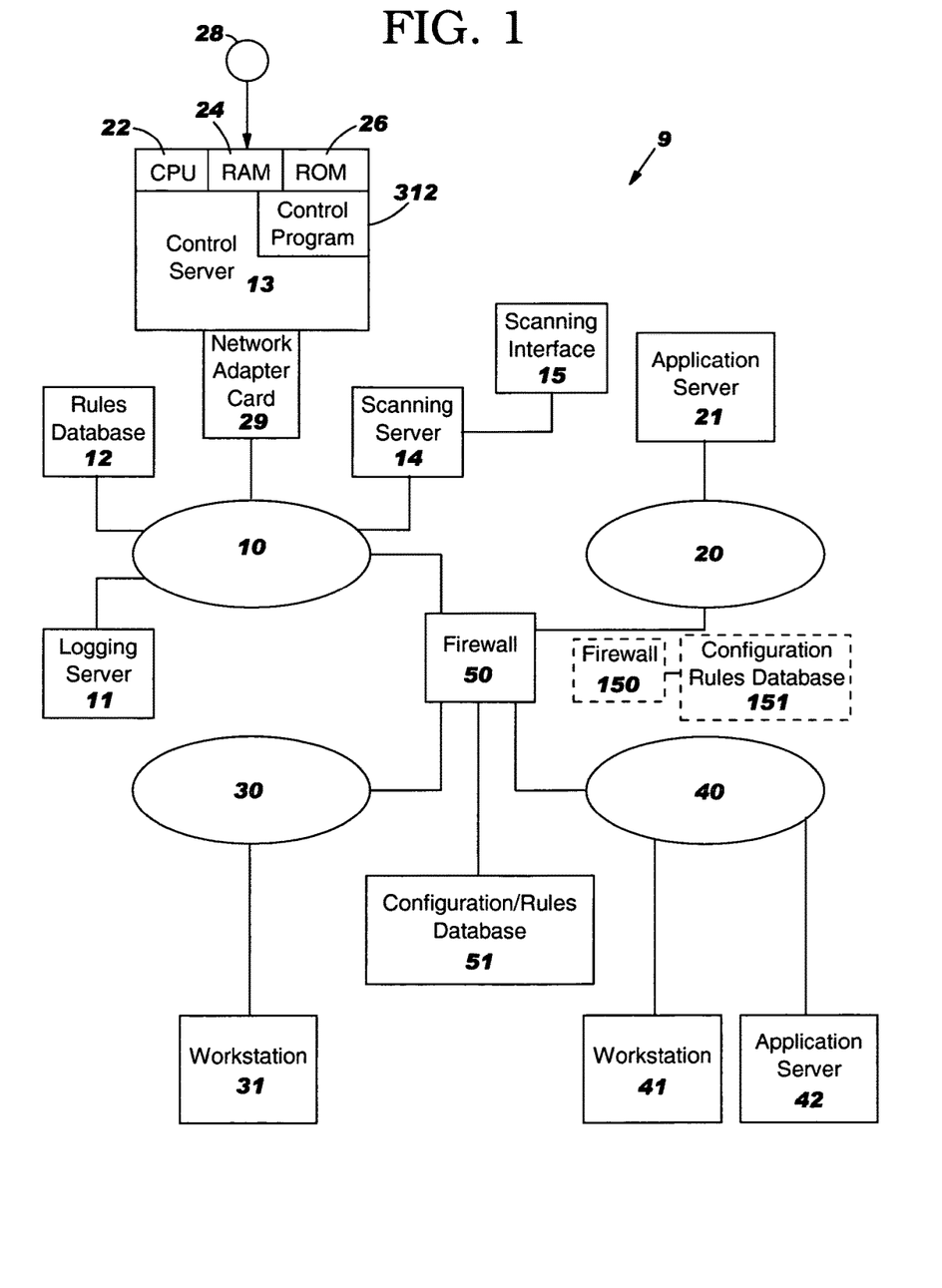
FIG. 1 is a block diagram of multiple, interconnected networks in which the present invention can be used, and includes a control server according to the present invention.

The present invention will now be described in detail with reference to the figures, wherein like reference numbers indicate like elements. FIG. 1 illustrates four networks 10, 20, 30 and 40 interconnected by a firewall 50 in a multi-network system 9. There are a variety of computing devices on networks 20, 30 and 40, and their type is not important to the present invention. In the illustrated example, on network 20 is an application server 21, on network 40 is an application server 42, on network 30 is a computer such as a workstation 31 which initiates connectivity to either of the application servers 21 or 42, and on network 40 is a computer such as a workstation 41 which initiates connectivity to either of the application servers 21 or 42. Firewall 50 performs known functions of enforcing the rules within its security policy. The rules are maintained in a database 51 within or accessible to the firewall 50. The rules specify what combinations of source IP address, destination IP address, port on the destination IP address, protocol, etc. are authorized. The firewall 50 permits such "authorized" messages to pass through the firewall to the intended destination device and port. Conversely, if a message arrives at the firewall and its source IP address, intended destination IP address, port on the destination IP address, protocol, etc. do not match one of the firewall's rules, then the firewall 50 will block and discard the message. All of the foregoing networks, workstations and application servers are prior art, as well as the foregoing function of firewall 50.

FIG. 1 also illustrates on network 10 a logging server 11, a database 12, a control server 13 and a scanning device 14 in accordance with one embodiment of the present invention. The logging server 11 logs source and destination address, protocol and disposition information about message packets which the firewall 50 has blocked. Database 12 stores message flow rules that should be represented in the security policy of the firewall. Scanning device 14 tests the destination port of each blocked message packet to determine if the port is open. Control server 13 (with the help of the scanning device 14) investigates message packets which the firewall 50 has blocked to determine if the destination port is open such that the message packet may have been blocked erroneously. Control server 13 includes a CPU 22, RAM 24, ROM 26 and control program 312. Control server 13 loaded control program 312 from a computer readable medium such as disk or tape 28 or network 10 via the Internet (not shown) and a network adapter card 29. While the scanning device 14, control server 13, database 12 and logging server 11 are illustrated in FIG. 1 as separate physical devices, they can be replaced by programs executing in a single server 13 and memory or storage devices resident on server 13, and performing the same scanning function, database function and logging function. The operation of logging server 11, control server 13 and scanning server 14 are described in more detail below.

Figure 2:
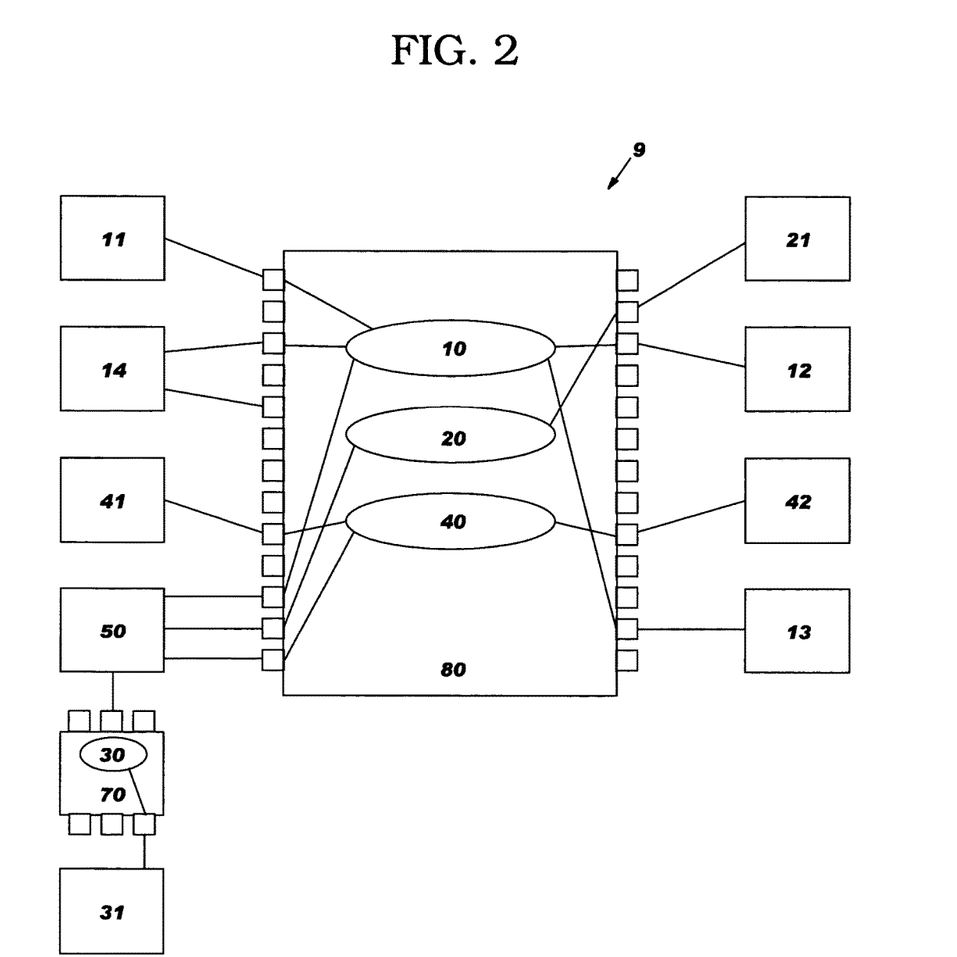
FIG. 2 is a block diagram illustrating an embodiment of the present invention where three networks of FIG. 1 are virtual private networks formed in part by a multi-port switch.

FIG. 2 illustrates an embodiment of the present invention where networks 10, 20 and 40 are virtual local area networks ("VLANs"), and network 30 is a VLAN as well. In this embodiment, there is a VLAN capable multi-port switch 80, as well as another multi-port switch 70 which may or may not be VLAN capable. Such switches are currently available, for example, Cisco™ layer 2/3 switch, Nortel™ layer 2/3 switch or 3Com™ layer 2/3 switch. Each VLAN is formed in part by connectivity within the switch 80 between specific ports. In the illustrated example, VLAN 10 is formed in part by connectivity within switch 80 to and between port 81 (for logging server 11), port 82 (for database 12), port 83 (for control server 13) and port 84 (for scanning server 14). VLAN 20 is formed in part by connectivity within switch 80 to port 91 (for application server 21). VLAN 40 is formed in part by connectivity within switch 80 to and between port 101 (for workstation 41) and port 102 (for application server 42). If network 30 is a VLAN as illustrated in FIG. 2, then network 30 is formed in part by connectivity within the switch 70 between specific ports. However, if switch 70 is not capable of creating VLANs, network 30 is formed by all the connections on switch 70. In the illustrated example, scanning server 14 also has an additional virtual connection to port 85 of switch 80. This port can be connected to any of the VLANs 10, 20 and 40 as needed to permit communication with, i.e. scanning of, a device port on the VLAN or on another network which is connected to the VLAN. There is internal connectivity available between ports 81-84, 91 and 101-102 within switch 80 to permit messages to pass between the VLANs 10, 20 and 40 when the message complies with a rule within the security policy of the firewall 50. Alternately, network 30 is a real network (with physical cabling and routers), and is physically connected to firewall 50. In the illustrated example, firewall 50 connects to ports 110, 120 and 140 of switch 80, and ports 110, 120 and 140 are connected within the switch 80 to networks 10, 20 and 40, respectively. The firewall reviews requests to send messages between devices on different VLANs 10, 20 and 40, and between VLANs 10, 20 and 40 and external network 30, and determines whether the firewall security policy has a rule which permits each message flow. The decision of firewall 50 whether to pass the message packet is then conveyed to the switch 80, which controls the destination network accordingly.

It should be noted that while FIG. 2 illustrates a VLAN embodiment of networks 10, 20 and 40, the present invention is also applicable to discrete forms of networks 10, 20 and 40, each comprising physical cabling and routers, and a discrete firewall comprising software executing on a physical computing device interposed between networks 10, 20, 30 and 40.

FIG. 3 illustrates processing, in accordance with the present invention within system 9, of message packets originating from workstation 31 on network 30 intended for application server 21 on network 20. (Similar processing would occur if the message packets originating from workstation 31 were destined for application server 42, or if the message packets originated from workstation 41 and were destined for application server 21. The processing illustrated in FIG. 3 applies regardless of whether networks 10, 20, 30 and 40 are virtual or real.) In step 300, workstation 31 sends onto network 30 a message addressed to application server 21. In accordance with known TCP/IP protocols such as TCP, UDP, ICMP, etc. and applications such as TELNET, HTTP, SSH, SSL, etc., the workstation's message is divided into packets. In one embodiment of the present invention, each packet comprises a header and a body. The header contains the destination IP address, port of the destination address, source IP address, port of the source IP address, protocol, fragmentation flags, type of service, and protocol version information. The body comprises an operational request and/or addresses or data. By way of example, the message can be a request to open a session, read or write data, access a web service or close a session.

Each message packet is routed (in the normal manner) to firewall 50 because firewall 50 is interposed between network 30 of the originating device and network 20 of the destination device. Firewall 50 then determines if the addressing and protocol parameters of the message packet match a "rule" within the security policy of the firewall 50 (step 301). In the illustrated embodiment, each rule defines a combination of source IP address, destination IP address, port of the destination device, protocol, etc. which is permitted to flow through the firewall 50. Firewall 50 maintains a list of the rules in database 51. If the addressing and protocol parameters of the message packet match a security policy rule (decision 302, yes branch), then the firewall 50 forwards it to network 20 which contains the destination device 21 (step 303). (In an alternate embodiment of the present invention, when a message packet matches a firewall rule, and this is the first match of this rule since the rule was created, then the firewall also sends the address and protocol parameters for this message packet to the control server for logging along with the expected action, i.e. to pass such a message packet.) Known routers or other routing devices in network 20 then forward the message packet to the destination device 21. However, if the addressing and protocol parameters of the message packet do not match a rule within the security policy of firewall 50 (decision 302, no branch), then firewall 50 does not forward the message packet to network 20 and instead discards the message packet (step 304). Then, firewall 50 identifies the source IP address, destination IP address, port of the destination device, protocol, etc.) of the discarded message packet to the logging server 11, and a management program 308 on the logging server logs these parameters of the discarded message packet (step 306). Next, the management program 308 on the logging server copies the addressing and protocol parameters of the discarded message packet to the control server 13 (step 310). In response, a control program 312 on the control server reads the source IP address, destination IP address, port of the destination address, protocol, etc. of the discarded message packet (step 314), and then compares them to its own rules database 12 (step 318). Database 12 maintains a list of combinations of source IP address, destination IP address, port of the destination address, protocol, etc. and whether they should be transferred through the firewall or discarded. If the source IP address is already stored in the database, the control program 312 then continues to check the rest of the parameters (decision 320, yes branch). However, if the source IP address does not match any known source IP addresses, this means a new connection is being attempted and the database 12 needs to be updated (decision 320, no branch). If the destination IP address is already stored in the database 12, the control program 312 then continues to check the rest of the parameters (decision 322). However, if the destination IP address does not match any known destination IP addresses, this means a new connection is being attempted and the database 12 needs to be updated (decision 320, no branch). If any rule specifying the protocol (and a respective source port and destination port), is already stored in the database 12, the control program 312 then continues to check the disposition (decision 323, yes branch). If any rule specifying the protocol (and a respective source port and destination port), is not already defined in the database, this means a new connection is being attempted (decision 323, no branch). If the combination of source IP address, destination IP address, port of the destination address, protocol, etc. of the discarded message packet match a combination in database 12, then control program 312 determines if the response listed in database 12 for this combination is to discard the message packet (decision 324). If so (decision 324, yes branch), then it was proper for firewall 50 to discard this message packet. Consequently, control program 312 stops its processing of the parameters of this discarded message packet (step 326). However, if the response listed in database 12 for this combination is to transfer the message packet through the firewall toward the destination device (decision 324, no branch), then it was not proper for firewall 50 to discard this message packet. Consequently, control program 312 alerts a firewall administrator that the firewall 50 should have passed the discarded message packet to the network of the destination device (step 330). This alert can be by e-mail, entry in a file of mishandled message packets, automatic formation of a problem ticket or display on a computer screen of the firewall administrator. The alert includes the source IP address, port of the source IP address, destination IP address, port of the destination address, protocol, etc. of the discarded message packet.

Referring again to decision 324, there are a variety of scenarios where the rules in database 12 may differ from the rules in database 51. In some systems, there are two or more different firewalls between a source device and a destination device. In FIG. 1, a second such firewall 150 and associated configuration/rules database 151 are illustrated in broken line; the message packet en route from workstation 31 to application server 21 encounters firewall 50 before firewall 150. In such a case, if neither firewall initially includes a rule to pass this firewall, the packet will be blocked at firewall 50. Then, after the steps of FIG. 3(A-E) are performed resulting from the blockage by firewall 50, the databases 12 and 51 are both updated to include a rule to permit this flow. In the illustrated embodiment, database 151 will not be updated at this time, so it will differ temporarily from database 12. However, when the next message packet is sent from workstation 31 to application server 21, the message packet will pass through firewall 50 but be blocked by firewall 150. Then, when the steps of FIG. 3(A-E) are performed resulting from blockage by firewall 150, the difference between database 12 and database 151 will become apparent, and result in updating of database 151 to include a rule to pass this message packet. There are other scenarios where the rules in database 12 may differ from the rules in database 51 (or database 151). For example, there can be different administrators for each database, and they each may update their respective database based on different information. As another example, the skill level of the administrator for database 12 may be higher than the skill level of the administrator for database 51 (and database 151), and consequently, the administrator for database 51 (and database 151) may be more likely to make mistakes than the administrator for database 12.

In response to the alert, the firewall administrator determines whether the security policy of firewall 50 was changed intentionally (to block this message flow) and is correct (decision 340). This determination is made based on a check of change requests which have been received, a contract with the customer, or contact with the service owner of the application server 21. If the security policy of the firewall 50 is correct (decision 340, yes branch), then the firewall administrator updates the database 12 within the control server 13 to indicate that this combination of source IP address, destination IP address, port of the destination address, protocol, etc. is not a permitted data flow through firewall 50 (step 344). This ends processing of the parameters for this message packet (step 346).

Refer again to decision 340, no branch where the security policy of firewall 50 is not correct, and firewall 50 should have a rule to pass message packets with this combination of source IP address, destination IP address, port of the destination address, protocol, etc. In such a case, the control program 312 sends a request to the firewall 50 for a description of its configuration, including. a list of which combinations of source IP address, destination IP address, port of destination address, protocol, etc. are permitted message flows (step 350). (This is sensitive information, so access is controlled by valid user ID and password.) Next, the control program 312 confirms that the combination of source IP address, destination IP address, port of destination address, protocol, etc. of the discarded message packet is not on the list or that the rule that would instruct the firewall 50 to process the message packet as expected is not overruled by another rule (step 360). Next, the control program 312 alerts the firewall administrator as to the problem with the configuration of firewall 50, for example, that the combination of source IP address, destination IP address, port of the destination address, protocol, etc. of the discarded message packet is not on the list or that the correct rule is in the wrong order and is being overruled (step 370). The alert can be by e-mail, entry in a file of mishandled message packets, automatic formation of a problem ticket or a display on a computer screen used by the administrator. Next, the control program 312 queries the firewall administrator to decide whether the firewall administrator should manually change the firewall configuration or whether the control program 312 should automatically change the firewall configuration (step 374). If the firewall administrator selects the automatic change, then the control program 312 automatically updates the firewall configuration to list this combination of source IP address, destination IP address, port of destination address, protocol, etc. as a permitted message flow (step 376). Control program 312 can perform this update by executing a stored script program which operates firewall 50. This completes processing of the parameters for this message packet (step 380). Refer again to step 374 where the firewall administrator selected manual correction of the configuration of firewall 50. In such a case, the control program 312 will send to the firewall administrator a suggested list of commands and parameters to operate firewall 50 to update the configuration of firewall 50 (step 384). Next, the firewall administrator provides the expected date the change will become effective (step 386). This date is stored in the database 12 (step 388) so the implementation can avoid alerting the firewall administrator of future events that match the current message packet until the change date has passed.

Refer again to decision 320 no branch as well as decision 322 where the database 12 in the control server does not include an entry for either the source IP address or the destination IP address. In such a case, the control program 312 identifies at this point that a new flow is being attempted. Consequently, control program 312 alerts a firewall administrator that the firewall 50 should have processed the message packet differently (390). This alert can be by e-mail, entry in a file of mishandled message packets, automatic formation of a problem ticket or display on a computer screen of the firewall administrator. The alert includes the source IP address, port of the source IP address, destination IP address, port of the destination address, protocol, etc. of the logged message packet. In response to the alert, the firewall administrator determines whether the security policy of firewall 50 was changed intentionally (to block this message flow) and is correct (decision 392). This determination is made based on a check of change requests which have been received, a contract with the customer, or contact with the service owner of the application server 21. If the security policy of the firewall 50 is correct (decision 392, yes branch), then the firewall administrator updates the database 12 within the control server 13 to indicate that this combination of source IP address, destination IP address, port of the destination address, protocol, etc. has changed to the current disposition of the message packet (step 394). This ends processing of the parameters for this message packet (step 396).

Refer again to decision 323 no branch where the database 12 in the control server does not include an entry for the protocol, or protocol specifics such as source port and destination port. In such a case, the control program 312 directs scanning server 14 to reconfigure its scanning interface 15 to connect to the network of the destination server (step 400). In the illustrated example, the destination server 21 resides on network 20. Next, the control program 312 directs scanning server 14 to reconfigure the scanning interface 15 with a valid IP address for network 20 such that scanning interface 15 resides on network 20 (step 402). (In both steps 400 and 402, control program 312 can direct scanning server 14 to reconfigure the scanning interface 15 by a script program or other interface provided for automation.) Next, the control program 312 sends to the scanning server 14 the source IP address, destination IP address, port of the destination address, protocol and source port of the discarded message packet (step 404). In response, the scanning server 14 scans the destination server 21 based on the destination IP address, port of the destination address, protocol, source port of the discarded message packet (step 406). This actual scanning is performed by sending a test packet to the port of the destination IP address of the discarded message packet using the protocol of the discarded message packet. The header of the test packet includes the source IP address and port of the scanning device, the destination IP address, port of the destination IP address, protocol, and protocol specifics such as source and destination ports. The intent of the scan is to determine whether the destination IP address and destination port are active and support the specified protocol. This will be indicated by an acknowledgment or other such response from the destination device to the test packet. Next, the scanning server returns the scan results to the control program 312 in the control server 13 (step 408). At this time, the scanning is complete, so the control program 312 directs the scanning server 14 to undo the reconfiguration performed in steps 400 and 402, such that the scanning interface 15 is no longer connected to any network, is not configured with any IP address and is in its "holding" state (step 412).

In alternate embodiments of the present invention, networks 10, 20 and 40 are not VPNs, and the firewall 50 is located between the scanning device and the destination IP address. In such a case, firewall 50 will include a message flow rule that if the source IP address is that of the scanning device 14, then the firewall 50 should pass the packet through to the destination IP address and port. This will allow the test packet to proceed from the scanning device to the destination IP address and port despite the fact that other "real" message packets from other source IP addresses addressed to the same destination IP address and port will not pass through the firewall 50 at this time.

Figure 3A:
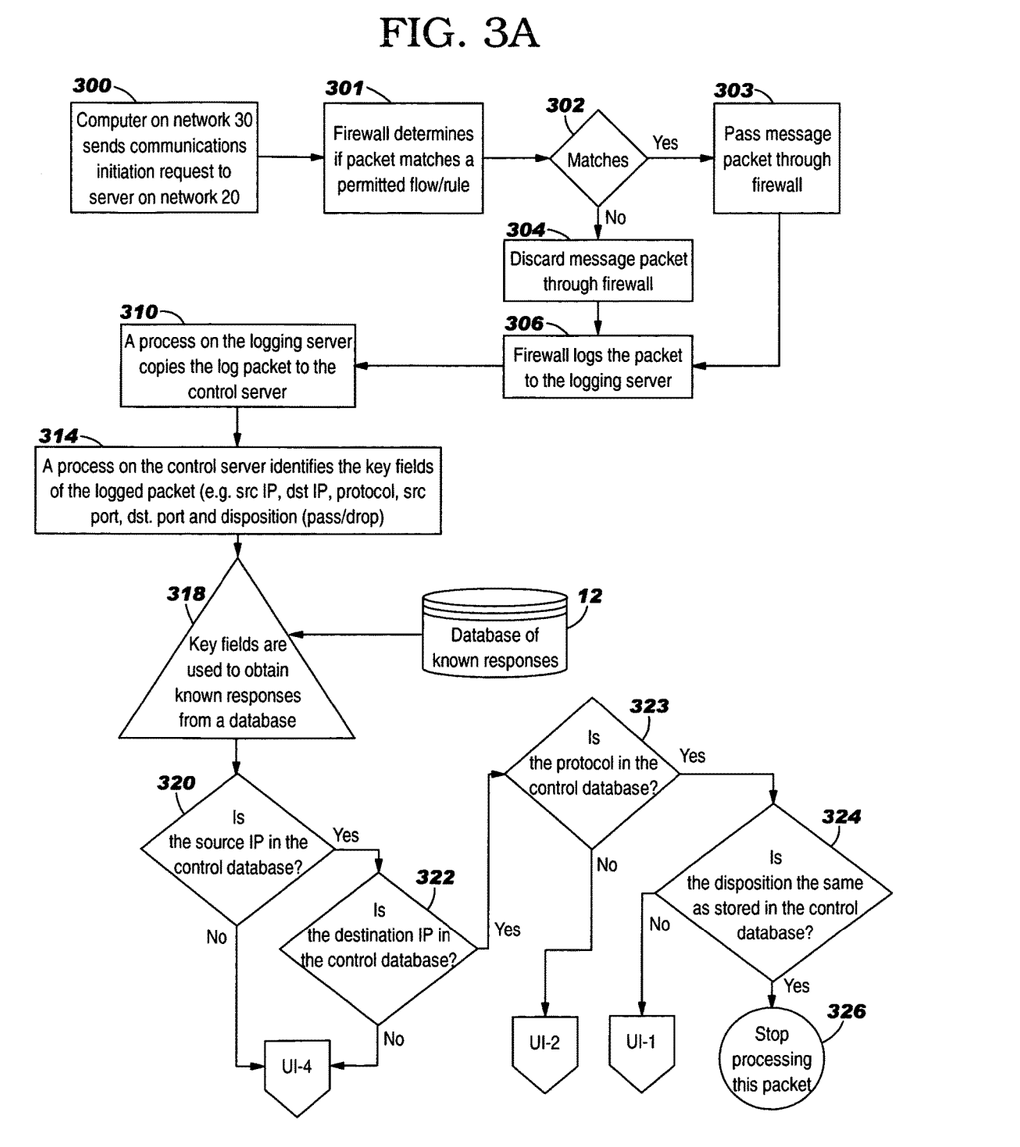
FIGS. 3(A), (B), (C), (D) and (E) form a flow chart illustrating operation of the control server and other components of the system of FIG. 1.
Figure 3B:
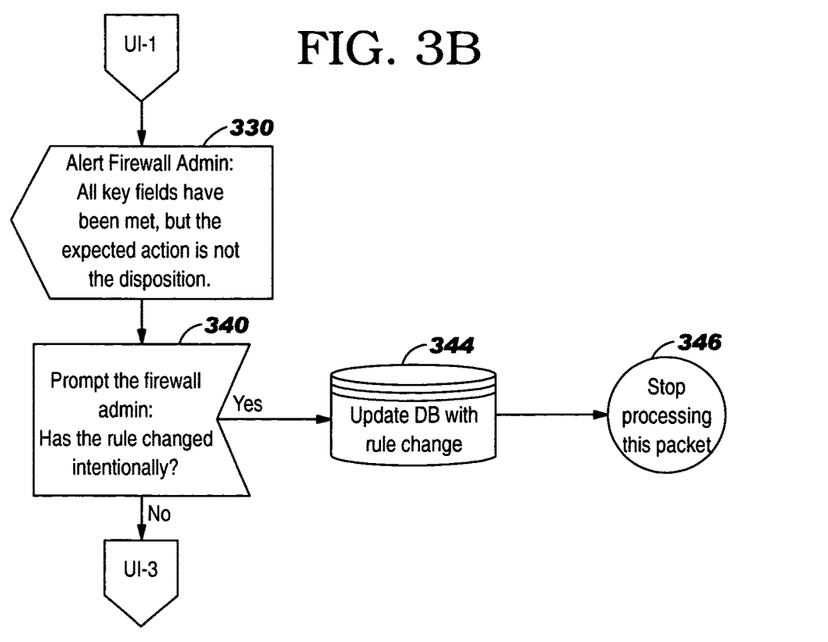
Figure 3C:
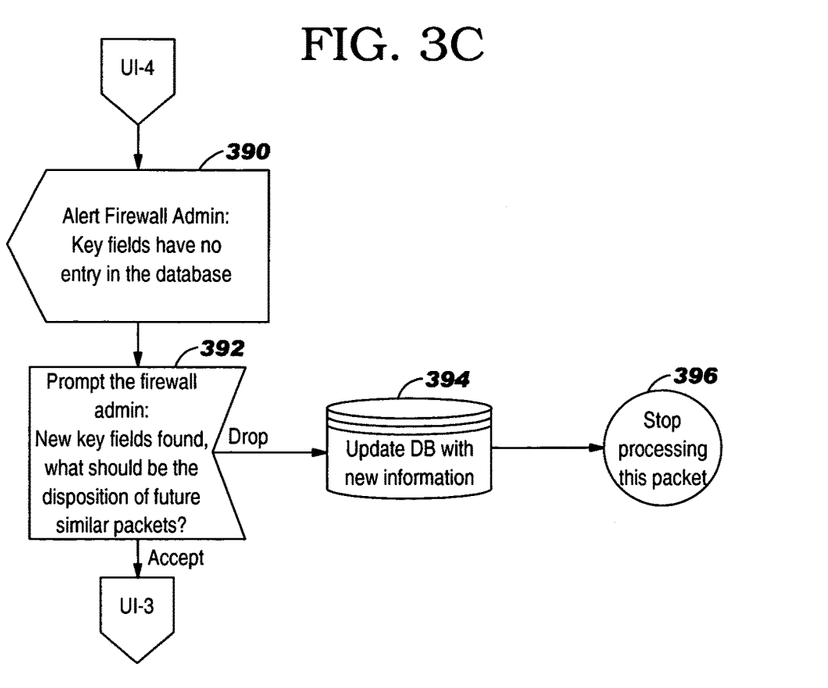
Figure 3D:
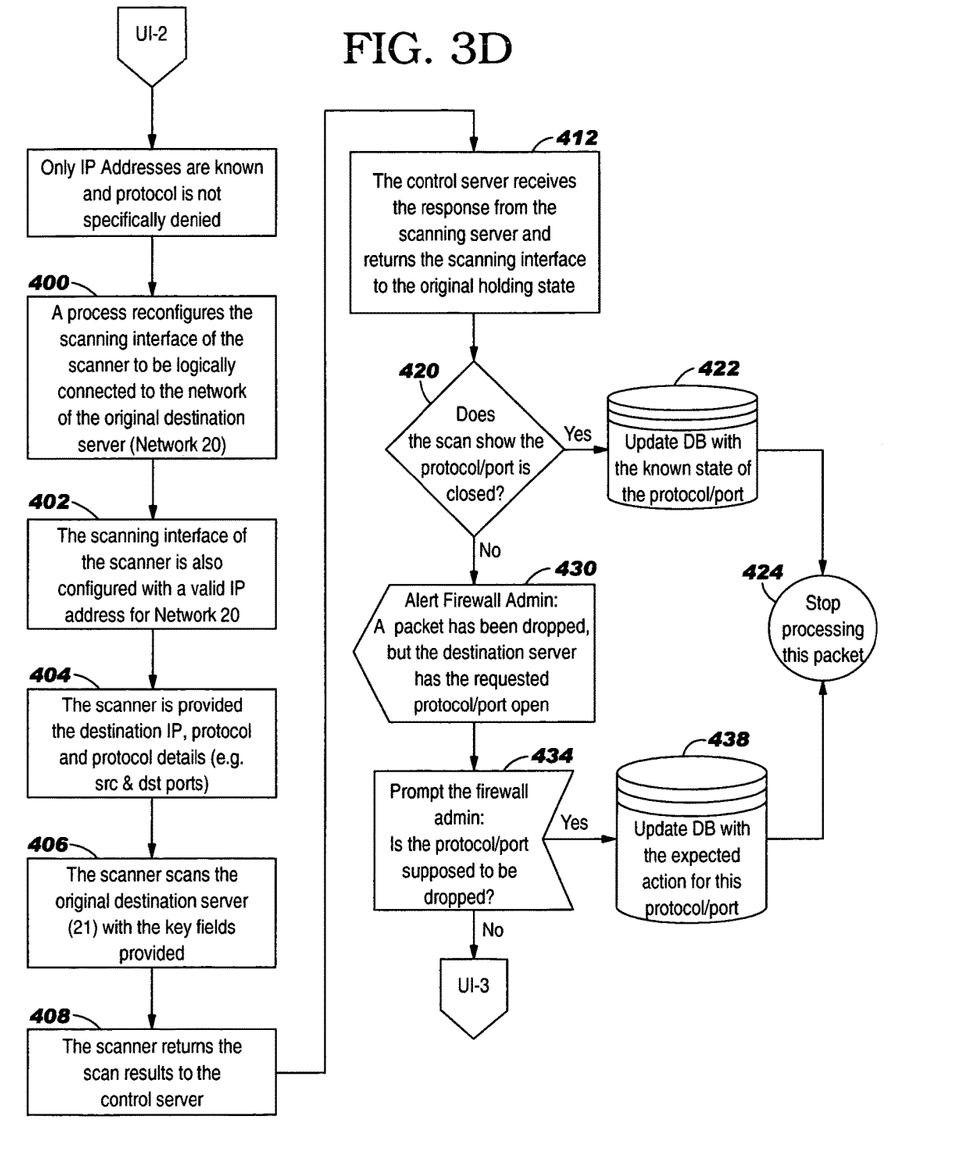
Figure 3E:
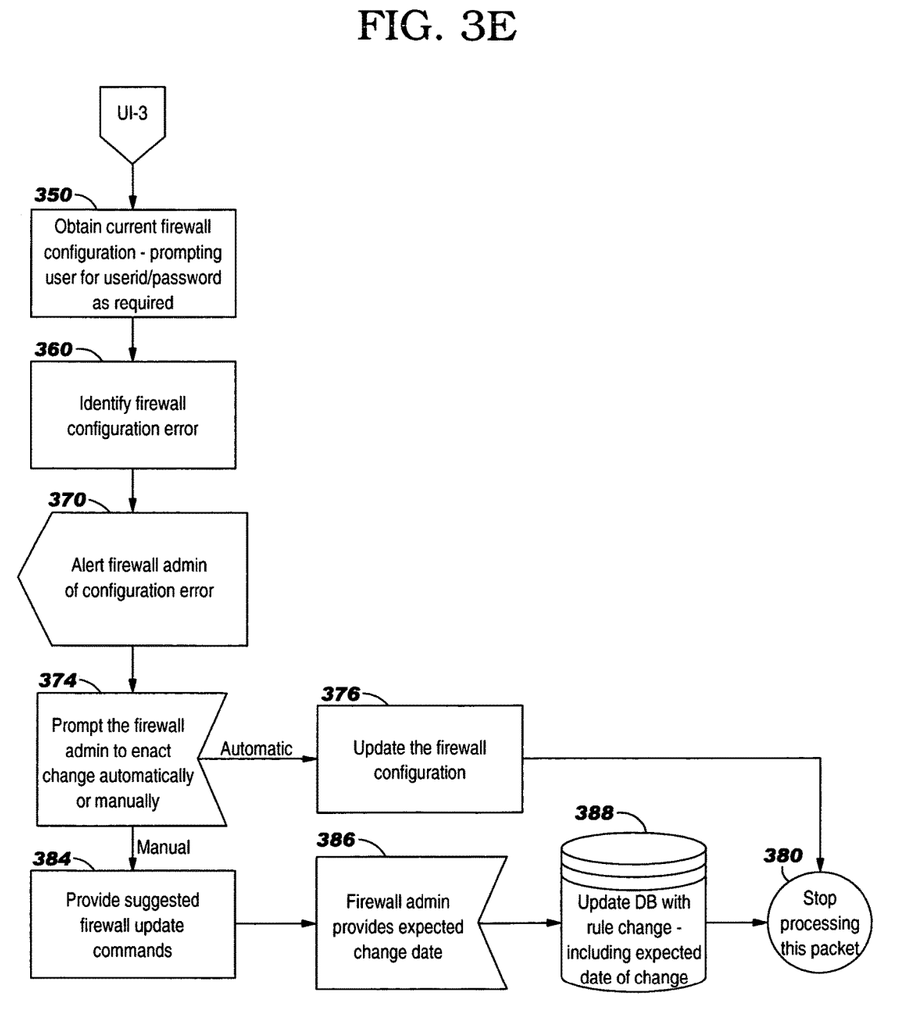

After steps 402-406 (as illustrated in FIG. 3(D) or in the alternate embodiments where the firewall 50 includes a rule to permit the test packet to pass through it), the control program 312 reviews the scan results to determine if the specified port and protocol of the destination server 21 are invalid or if the port is closed (decision 420). If so (decision 420, yes branch), then the control program 312 updates database 12 to indicate that this combination of port and protocol on destination server 21 is not valid or open (step 422). This ends processing of the parameters for the discarded message packet (step 424). Refer again to decision 420, no branch, where the specified port and protocol are valid and open on the destination server 21. In such a case, there may be a problem with the firewall configuration and information in the database 12, i.e. it is possible that the firewall should have passed this message packet to the network 20 of the destination server 21. Thus, control program 312 alerts the firewall administrator that a message packet with the foregoing combination of source IP address, destination IP address, port of the destination address, protocol, and protocol specifics such as source port or destination port, has been discarded but the destination server has the specified port open and supports the specified protocol at this port (step 430). Next, the control program 312 queries the firewall administrator to answer whether the specified combination of destination port and protocol is supposed to be invalid and closed (step 434). If the firewall administrator responds that the specified combination of port and protocol is supposed to be invalid and closed, then the control program 312 updates database 12 that the expected response to a message packet with this combination of destination device, port or the destination address and protocol is to discard the message packet (step 438). However, if the firewall administrator responds that the specified combination of port and protocol is supposed to be valid and open, then the control program 312 proceeds to step 350 to update the firewall configuration/security policy to pass the foregoing message packet.

Based on the foregoing, a system, method and computer program for identifying additional rules which may be needed by a firewall to permit messages with different combinations of source IP address, destination IP address, destination port, protocol, etc. to flow through the firewall, have been disclosed in accordance with the present invention. However, numerous modifications and substitutions can be made without deviating from the scope of the present invention. For example, another implementation might log permitted packets as well as dropped packets. Therefore, the present invention has been disclosed by way of illustration and not limitation, and reference should be made to the following claims to determine the scope of the present invention.

The invention claimed is:

1. A method for managing a security policy of a firewall, the firewall receiving a message packet addressed to a specified port of a destination IP address and determining that the firewall does not have a message flow rule specifying a combination of a source IP address, source port, protocol, destination IP address, and destination port which permits passing of the message packet to the port of the destination IP address, the method comprising the steps of:
responsive to a determination that the firewall blocked the message packet from being sent to the port of the destination IP address due to the absence in the firewall of the message flow rule, sending to a port scanning device a command directing the port scanning device to test the port of the destination IP address to determine if the port is open;
identifying, by a processor, a response from the port scanning device indicating whether the port is open; and
if so, automatically querying an administrator whether the firewall should have a message flow rule which permits passing of the message packet to the port of the destination IP address,
if not, not querying an administrator whether the firewall should have the message flow rule which permits passing of the message packet to the port of the destination IP address.

2. A method as set forth in claim 1 further comprising the steps of:

receiving a response from the administrator that the firewall should have the message flow rule which permits passing of the message packet to the port of the destination IP address, and in response, automatically adding a message flow rule to the security policy of the firewall to permit passing of message packets to the port of the destination IP address if the message packets are addressed to the port of the destination IP address.

3. A method as set forth in claim 1 further comprising the steps of:
receiving a response from the administrator that the firewall should have the message flow rule which permits passing of the message packet to the port of the destination IP address, and in response, advising the administrator how to add a message flow rule to the security policy of the firewall to permit passing of message packets to the port of the destination IP address if the message packets are addressed to the port of the destination IP address.

4. A method as set forth in claim 1 further comprising the step of:
determining, by the processor, if a protocol of the message packet is not acceptable in a network containing the destination IP address before the step of testing the port of the destination IP address.

5. A method as set forth in claim 1 wherein the command directing the port scanning device to test the port of the destination IP address to determine if the port is open directs the port scanning device to send a test message packet to the port and check for an acknowledgment or other response indicating that the port is open.

6. A method as set forth in claim 5 wherein the firewall is located between the port scanning device and the destination IP address, and the firewall includes a message flow rule which permits the test message packet to flow from a source IP address of the port scanning device to the destination IP address.

7. A system for managing a security policy of a firewall, the firewall receiving a message packet addressed to a specified port of a destination IP address and determining that the firewall does not have a message flow rule specifying a combination of a source IP address, source port, protocol, destination IP address, and destination port which permits passing of the message packet to the port of the destination IP address, the system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instruction to send to a port scanning device a command directing the port scanning device to test the port of the destination IP address to determine if the port is open responsive to a determination that the firewall blocked the message packet from being sent to the port of the destination IP address due to the absence in the firewall of the message flow rule;
program instructions to identify a response from the port scanning device indicating whether the port is open; and
program instructions, responsive to the port being open, to query an administrator whether the firewall should have a message flow rule which permits passing of the message packet to the port of the destination IP address, and wherein the system is responsive to the port not being open, to not query an administrator whether the firewall should have the message flow rule which permits passing of the message packet to the port of the destination IP address.

8. A system as set forth in claim 7 further comprising:
program instructions stored on at least one of the one or more storage devices for execution by at least one of the one or more processors via at least one of the one or more memories, to receive a response from the administrator that the firewall should have the message flow rule which permits passing of the message packet to the port of the destination IP address, and in response, automatically add a message flow rule to the security policy of the firewall to permit passing of message packets to the port of the destination IP address.

9. A system as set forth in claim 7 further comprising:
program instructions stored on at least one of the one or more storage devices for execution by at least one of the one or more processors via at least one of the one or more memories, to receive a response from the administrator that the firewall should have the message flow rule which permits passing of the message packet to the port of the destination IP address, and in response, advise the administrator how to add a message flow rule to the security policy of the firewall to permit passing of message packets to the port of the destination IP address.

10. A system as set forth in claim 7 further comprising:
program instructions stored on at least one of the one or more storage devices for execution by at least one of the one or more processors via at least one of the one or more memories, to determine if a protocol of the message packet is not acceptable in a network containing the destination IP address before testing the port of the destination IP address.

11. A system as set forth in claim 7 wherein the command directing the port scanning device to test the port of the destination IP address to determine if the port is open directs the port scanning device to send a test message packet to the port and check for an acknowledgment or other response indicating that the port is open.

12. A system as set forth in claim 11 wherein the firewall is located between the port scanning device and the destination IP address, and the firewall includes a message flow rule which permits the test message packet to flow from a source IP address of the port scanning device to the destination IP address.

13. A computer program product for managing a security policy of a firewall, the firewall receiving a message packet addressed to a specified port of a destination IP address and determining that the firewall does not have a message flow rule specifying a combination of a source IP address, source port, protocol, destination IP address, and destination port which permits passing of the message packet to the port of the destination IP address, the computer program product comprising:
one or more computer-readable tangible storage devices and program instructions stored on at least one of the one or more storage devices, the program instructions for execution by a computer, comprising:
program instructions for sending to a port scanning device a command directing the port scanning device to test the port of the destination IP address to determine if the port is open responsive to a determination that the firewall blocked the message packet from being sent to the port of the destination IP address due to the absence in the firewall of the message flow rule;
program instructions for identifying a response from the port scanning device indicating whether the port is open; and
program instructions, responsive to the port being open, for querying an administrator whether the firewall should have a message flow rule which permits passing of the message packet to the port of the destination IP address, and wherein the computer program product is responsive to the port not being open, by not querying an administrator whether the firewall should have the message flow rule which permits passing of the message packet to the port of the destination IP address.

14. A computer program product as set forth in claim 13 further comprising:
program instructions for receiving a response from the administrator that the firewall should have the message flow rule which permits passing of the message packet to the port of the destination IP address, and in response, automatically add a message flow rule to the security policy of the firewall to permit passing of message packets to the port of the destination IP address.

15. A computer program product as set forth in claim 13 further comprising:
program instructions for receiving a response from the administrator that the firewall should have the message flow rule which permits passing of the message packet to the port of the destination IP address, and in response, advise the administrator how to add a message flow rule to the security policy of the firewall to permit passing of message packets to the port of the destination IP address.

16. A computer program product as set forth in claim 13 further comprising:
program instructions for determining if a protocol of the message packet is not acceptable in a network containing the destination IP address before testing the port of the destination IP address.

17. A computer program product as set forth in claim 13 wherein the command directing the port scanning device to test the port of the destination IP address to determine if the port is open directs the port scanning device to send a test message packet to the port and check for an acknowledgment or other response indicating that the port is open.

18. A computer program product as set forth in claim 17 wherein the firewall is located between the port scanning device and the destination IP address, and the firewall includes a message flow rule which permits the test message packet to flow from a source IP address of the port scanning device to the destination IP address.

19. A method for managing a security policy of first and second firewalls located between a source IP address and a destination IP address, the first firewall receiving a message packet addressed to a specified port of the destination IP address and determining that the first firewall does not have a message flow rule specifying a combination of the source IP address, source port, protocol, the destination IP address, and destination port which permits passing of the message packet to the port of the destination IP address, the second firewall not having a message flow rule which permits passing of the message packet to the port of the destination IP address, the method comprising the steps of:
checking a central database to learn that the central database does not have a record of whether the first firewall should have a message flow rule which permits passing of the message packet to the port of the destination IP address, and in response, sending to a port scanning device a command directing the port scanning device to test the port of the destination IP address to determine if the port is open;

identifying a response from the port scanning device indicating whether the port is open; and if the port is open, updating the central database to indicate that both the first and second firewalls should have a message flow rule which permits passing of the message packet to the port of the destination IP address, and updating the security policy of the first firewall with the message flow rule which permits passing of the message packet to the port of the destination IP address.

20. A method as set forth in claim 19 further comprising a subsequent step of:

upon receipt at the second firewall of a message packet addressed to the specified port of the destination IP address and a determination that the second firewall does not have the message flow rule which permits passing of the message packet to the port of the destination IP address, checking the central database to learn that the second firewall should have the message flow rule which permits passing of the message packet to the port of the destination IP address and updating the security policy of the second firewall with the message flow rule which permits passing of the message packet to the port of the destination IP address.

21. A method as set forth in claim 20 wherein in response to the receipt at the second firewall of a message packet addressed to the specified port of the destination IP address and learning from the central database that the second firewall should have the message flow rule which permits passing of the message packet to the port of the destination IP address, there is not a second test of the port to determine if the port is open.

* * * * *